Feb. 14, 1939. O. A. ROSS 2,147,499
METHOD FOR PRODUCING SOUND MOTION PICTURES AND APPARATUS THEREFOR
Original Filed July 29, 1929 4 Sheets-Sheet 1

Oscar A. Ross
INVENTOR.

Fig. 3.

Feb. 14, 1939.   O. A. ROSS   2,147,499
METHOD FOR PRODUCING SOUND MOTION PICTURES AND APPARATUS THEREFOR
Original Filed July 29, 1929   4 Sheets-Sheet 2

Oscar A. Ross,
INVENTOR.

Feb. 14, 1939.   O. A. ROSS   2,147,499
METHOD FOR PRODUCING SOUND MOTION PICTURES AND APPARATUS THEREFOR
Original Filed July 29, 1929   4 Sheets-Sheet 3

Feb. 14, 1939.　　　　　O. A. ROSS　　　　　2,147,499
METHOD FOR PRODUCING SOUND MOTION PICTURES AND APPARATUS THEREFOR
Original Filed July 29, 1929　　　　4 Sheets-Sheet 4

Oscar A. Ross.
INVENTOR.

Patented Feb. 14, 1939

2,147,499

UNITED STATES PATENT OFFICE 2,147,499

METHOD FOR PRODUCING SOUND MOTION PICTURES AND APPARATUS THEREFOR

Oscar A. Ross, New York, N. Y.

Application July 29, 1929, Serial No. 381,793
Renewed March 25, 1935

13 Claims. (Cl. 88—16.2)

This invention belongs to that class more generally known as talking or sound motion pictures and more particularly to that class which the applicant has termed animated talking motion pictures and wherein accompanying dialogue, song, or other sound is synchronized to the movement, or action of inanimate beings, or figures, or cartoons which are animated for the purpose of producing the animated talking motion picture.

One object of this invention is to produce a method of producing talking motion pictures, animated, or normally acted, wherein the sound to be accompanied to the action for exhibition purposes may be produced as a sound record independently of the action record and thereafter the action record may be produced to synchronize with the sound record whereby the subsequent projection of both the records as a talking motion picture exhibition will effect synchronism thereof in the same manner as if the action record and the sound record had been initially recorded simultaneously for the purpose of synchronization.

Another object is to furnish a method and apparatus for producing sound record members upon which a source of sound is recorded onto a track simultaneously with recording a character image depicting the source producing the sound, upon a cor-related track whereby the location of the sound source on the sound track may be more accurately determined by reference to the sound source characters depicted on the image track.

Another object is to furnish a method and apparatus for recording sound onto a sound record simultaneously with graphically recording the character of the sound produced whereby a motion picture action record may be subsequently produced to synchronize with the sound record for producing a talking motion picture production.

Another object is to furnish a method and apparatus for recording sound without simultaneously recording the action to be accompanied thereto whereby the action may be thereafter recorded in proper chronological order to form a talking motion picture production wherein the action and sound will be synchronized as and when they are exhibited as a talking motion picture.

Another object is to furnish a method and apparatus for producing talking motion picture productions wherein the sound record and the action record may be initially independently recorded onto separated record members at differing periods and thereafter adapted to reproduce the sound and action in synchronism as a talking motion picture.

Another object is to furnish a method and apparatus for producing a sound record on one form of sound record supporting member from the reproduced sound produced by the sound record supported by a differing form of sound record supporting member.

Another object is to produce sound wave affected apparatus for separatedly recording the initiation, duration and intensity of one or more sources of sound for identification purposes, simultaneously with normally recording the sound from all the sources onto a single sound record for the reproduction of the sounds thereon.

Another object is to furnish means for manually effecting the production of separated identification records indicating the initiation and duration of each of a plurality of overlapping sounds, simultaneously with normally recording the sound onto a single sound record for the reproduction thereof.

Another object is to furnish a novel form of apparatus for chronologically recording the performance of a rehearsal for a talking motion picture production whereby the several actions and dialogues are more accurately chronologically determined.

Another object is to furnish a novel form of "continuity print" preferably termed the "master print" whereby the action and/or sound periods occurring during the performance of a play or sketch may be chronologically recorded on comparatively condensed form as the performance progresses.

Another object is to furnish another novel form of continuity print, preferably termed the "dialogue or sound print" whereby the lines of the dialogue and/or sound produced during the performance of a play or sketch may be recorded chronologically as well as the terms of motion picture frames.

Another object is to furnish still another form of continuity print preferably termed the "action direction print" whereby animated actions to be recorded onto the frames of a motion picture film may be recorded to synchronize with previously recorded dialogue or musical accompaniment for the purpose of producing a talking motion picture production.

Another object is to furnish still another novel form of continuity print preferably termed the "action directing print" whereby suitable animated action to be exhibited by successive motion picture frames may be recorded to synchronize with previously recorded sources of sound.

Another object is to furnish a novel form of motion picture film having a sound record track and an action record track cor-related thereto, the sound track supporting a normal sound record and the action track depicting the characters of the sound recorded onto the sound track.

Another object is to furnish another novel form of motion picture film having a sound track and an action track cor-related thereto, the action record track supporting a normal action record thereon and the sound track arbitrarily supporting reference numerals for cor-relating the action record frames of the action record to the sound record to be substituted for the numerals during a printing process thereafter.

Another object is to furnish still another novel form of motion picture film having a sound record track, a sound initiation and duration track and an action track thereon in cor-relation to each other, the action track indicating the character of the sound recorded onto the sound track and the sound initiation and duration track indicating the initiation and duration of the sounds as produced and recorded onto the sound track.

Another object is to furnish a novel form of motion picture film printing whereby sound and action records supported on separated films may be combined onto a single film for exhibition purposes.

Another object is to furnish novel apparatus for advancing continuity prints having chronological tracks whereby sound and action records pertaining to a talking motion picture production may be chronologically recorded as the performance thereof is enacted for subsequently synchronizing separately recorded sounds and actions.

Other objects and advantages will appear as the description of the invention progresses and the novel features of the invention will be pointed out in the appended claims.

This invention consists in the novel construction and arrangement of parts hereinafter described, delineated in the accompanying drawings and particularly pointed out in that part of this instrument wherein patentable novelty is claimed for certain and peculiar features of the methods and apparatus, it being understood that, within the scope of what hereinafter thus is claimed, divers changes in the form, proportions, size and minor details of the structure shown may be made without departing from the spirit of, or sacrificing any of the merits of the invention.

In describing the invention in detail, reference is made to the accompanying drawings wherein I have illustrated embodiments of the invention, and, wherein like characters of references, designate corresponding parts throughout the several views, and in which:—

Fig. 4 illustrates diagrammatically a method of recording animated actions and the apparatus therefor, and Fig. 5 illustrates a portion of a motion picture film produced thereby, and Fig. 6 illustrates a modified method and apparatus therefor for producing combined normal sound and sound depicting records onto a film, and Fig. 7 illustrates the sound record and sound depicting film produced thereby, and Fig. 8 is a plan view of a camera mask, and Fig. 9 diagrammatically illustrates a method of transferring a sound record from one form of sound record supporting member to a sound record supporting member of another form, and Fig. 10 diagrammatically illustrates a method of and apparatus therefor for recording sound identification marks simultaneously with recording a sound record onto a sound record member, and Fig. 11 diagrammatically illustrates a method of printing separated sound and action record films onto a single combined sound and action record film, and Fig. 12 is a diagrammatic view of apparatus and a method for producing continuity prints, and Fig. 13 is a form of continuity print produced thereby, and Fig. 14 illustrates a form of "action direction print" employed in one step of producing animated talking motion pictures.

Figure 1:
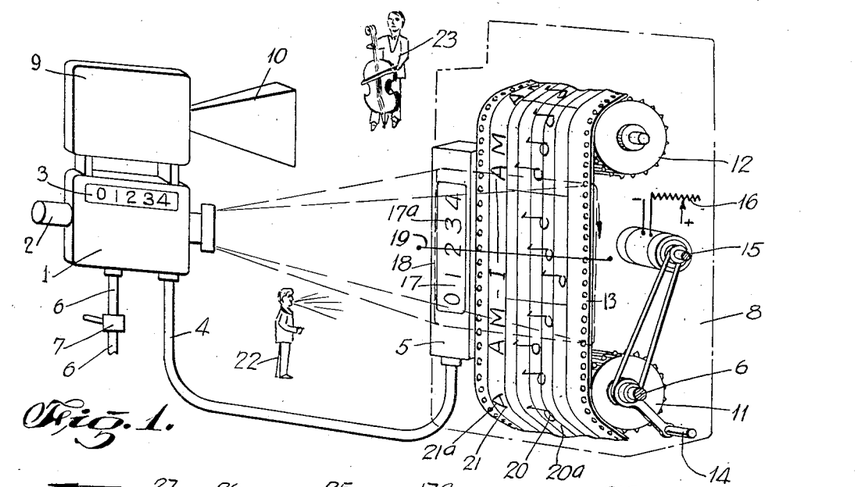
Figure 1 diagrammatically illustrates one method and apparatus therefor for producing normal sound records and sound depicting prints as one step in the method of producing talking motion pictures.

Referring to Fig. 1, motion picture camera 1, of known form driven by motor 2, and modified to include the frame counter 3, indicating frames of motion pictures in place of feet as is customary, also modified to include a suitable shaft drive 4, arranged to drive counter 5, in synchronism with counter 3, also modified to include a suitable shaft drive 6, having a disconnecting clutch 7, arranged to drive sound depicting apparatus 8, and also modified to cooperate with sound recording camera 9, arranged to photographically record a sound record onto a sound track parallel to the sound depicting record recorded onto the normal action track of a motion picture film avanced by camera 1.

The sound depicting apparatus 8, comprises in part rollers 11 and 12 arranged to advance sound depicting print, tape or ribbon 13, roller 11 being arranged to be driven by shaft 6 actuated by camera 1, or by motor 15, the speed of which may be varied by a suitable resistance 16. The sound depicting counter 5, is positioned adjacent one edge of print 13 and the dial 17 thereof is arranged to be photographically recorded with the recording of the depicted sound characters appearing on said print within the frame line 18 representing a standard motion picture frame preferably of the 35 mm. standard, a suitable hairline 19, indicating the center line of each frame photographically recorded. The apparatus 8 may comprise a self-playing instrument, as for example a player-piano, in which case the print 13, would comprise the perforated music roll onto which the musical score 20a of the sound depicting track 20, and the words 21a of the word track 21 would be superimposed graphically upon the perforated portion of the music roll, and to, or without the accompaniment of said self-playing instrument, a singer as 22, or a musician as 23, may be rendering the solo parts of the musical score 20a.

Figure 2:
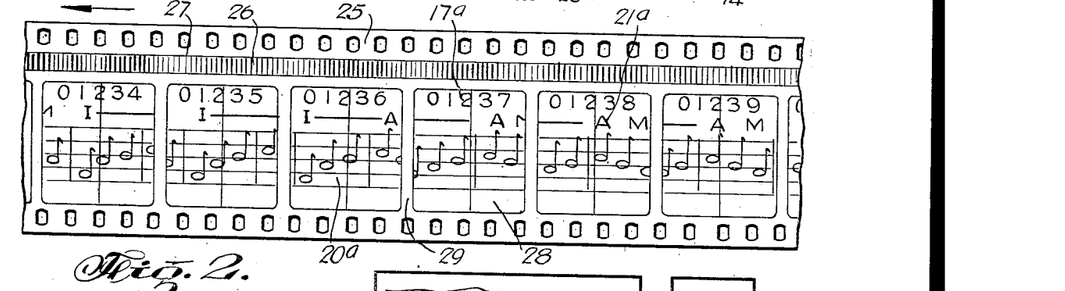
Fig. 2 illustrates a portion of a sound record and sound depicting film produced thereby, and Fig. 3 diagrammatically illustrates a method of recording sound waves and identification marks therefor onto a sound record film.

Referring to Fig. 2, showing in enlarged form a portion of a developed motion picture negative film 25 produced by cameras 1 and 9, and onto which the sound waves 26 have been indicated as photographically recorded onto sound track 27, and the musical score representing the sound which will be reproduced by said waves is depicted photographically on the sound depicting frames 28 of the sound depicting track 29 as well as the words accompanied therewith and the reference numerals 17a whereby the recorded sound may be accurately synchronized to accompanying action as hereinafter more fully described.

Figure 3:
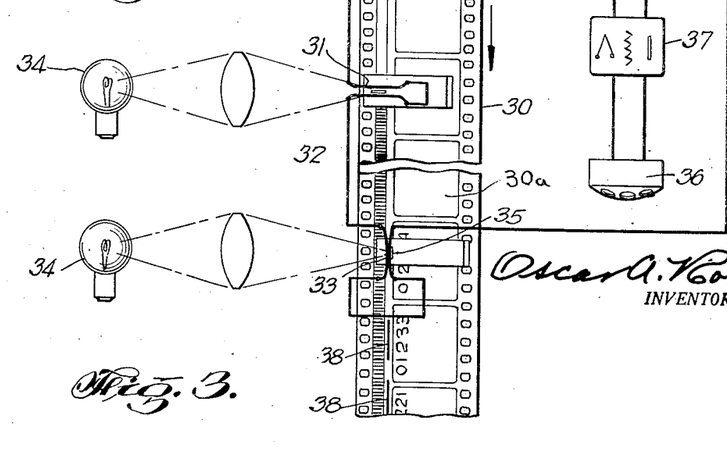

Referring to Fig. 3, showing a method of lineally recording the intensity, initiation and duration of a source of sound recorded onto film 30, the light valve 31, supported by camera 9, is arranged to normally record the sound produced by the source onto sound track 32 in known form, whereas the light valve 33, which may also be supported by camera 9, has its vibrating ribbons arranged parallel to the movement of the sound track and normally are positioned whereby no light can pass through light slit 35, however upon sound waves affecting microphone 36, both light valves are caused to vibrate, the light valve 31, normally recording the sound produced and the light valve 33 recording the sound as a variable width line, as 38, the width of the line being substantially proportional to the intensity of the sound produced and its length the time interval of duration of the sound, in this manner indicating in a compact transverse space on the film the character of the sound recorded onto the sound track 32. The light valves 31 and 33 are preferably arranged in a series circuit and controlled by the amplifier, or gain unit 37, the input circuit of which receives the energy impulses from microphone 36. It is to be noted that the sound intensity and duration line is recorded between the normal sound track 32 and the normal action track 30a of a dual track motion picture film to be employed for producing talking motion pictures.

Figures 4, 5, 6, 8:
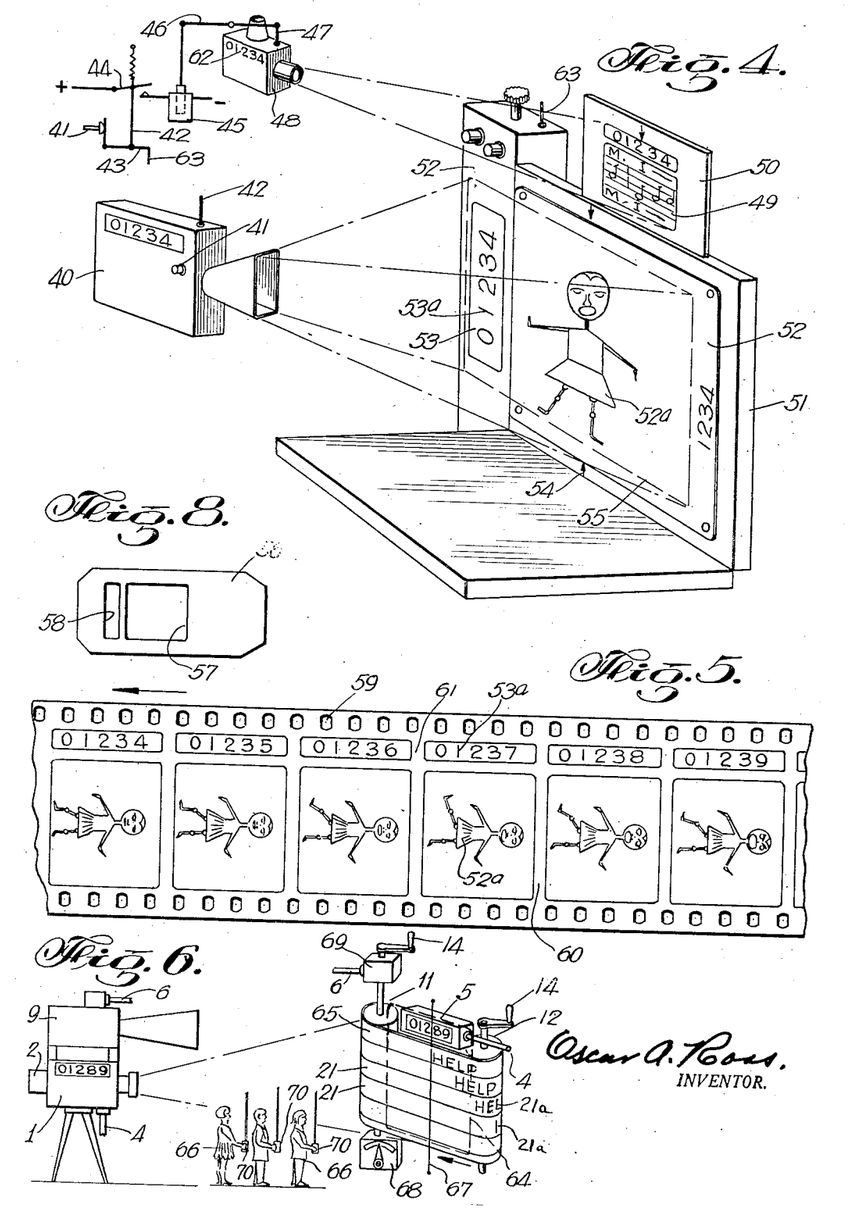

Referring to Figs. 4, 5 and 8, motion picture camera 40, single frames of motion picture film in which are recorded by depressing button 41, may be of known form employed for recording the action of animated motion picture productions, or similar productions, however is modified to include rod 42 arranged to be reciprocated by lever 43 each time button 41 is depressed to record a frame, thereby closing switch 44 to energize magnet 45 and operate lever 46 arranged to reciprocate rod 47 of projector, or lantern 48 of known form and advance a motion picture film as 25 (Fig. 2), therein one frame, said projector being positioned to direct an image as 49 depicted by said film onto screen 50 arranged adjacent stage, or cartoon support table 51 supporting a cartoon as 52 depicting a dancing figure 52a. Arranged adjacent the stage 51, is supported counter 52 having its dial 53 arranged in fixed relation to the center line 54 indicating the center line of the action frame recorded by camera 40, said camera being positioned whereby the entire normal frame recorded will be substantially of the delineation shown by the dotted line 55, however a mask as 56, (Fig. 8) having action aperture 57 and reference numeral aperture 58, is inserted into said camera in known manner thereby masking off the action 52a onto the action track 60 of film 59 (Fig. 5) and the reference numerals 53a onto the reference numeral track 61 of said film, the reference numeral track being in substantially the same relative transverse location on the film as the sound track of film 25 to be synchronized thereto, and the action track being of substantially the same width and other dimensions as required by the standards of the Society of Motion Picture Engineers for talking motion picture films whereon the sound and action tracks are recorded onto a single film for exhibition purposes.

The projector 48 is preferably supplied with a counter 62 indicating the advancement of each frame of film therethrough. The lever 43 is also preferably arranged to operate counter 52 through rod 63, however the counter is not advanced to a succeeding numeral until after the action has been recorded by camera 40.

Figures 7, 11, 14:
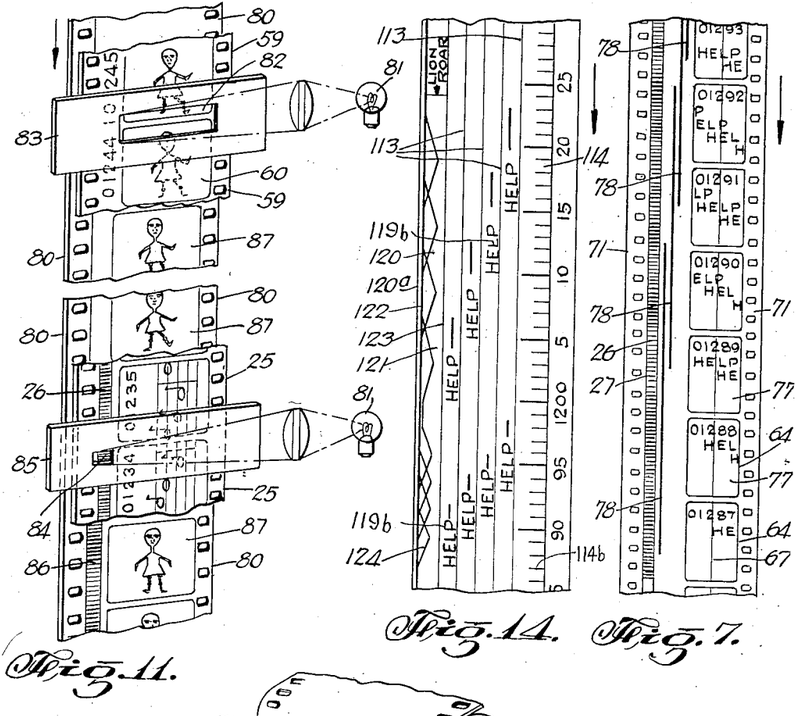
Figure 10:
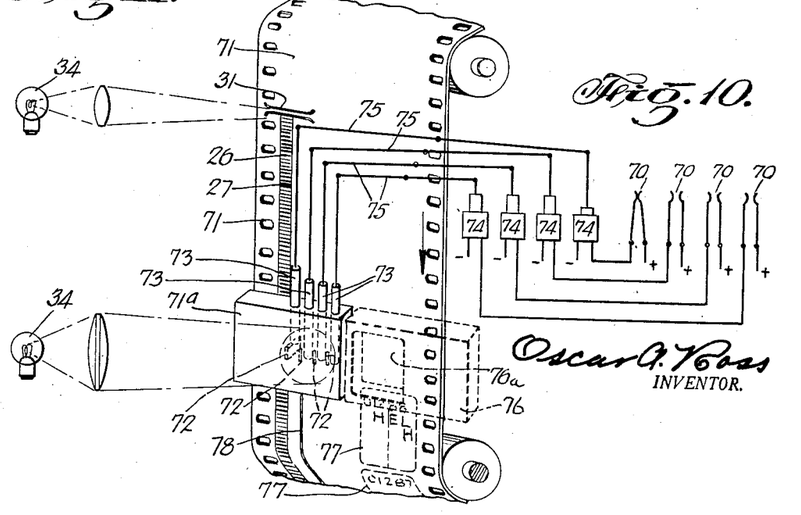

Referring to Figs. 6, 7, and 10 showing a modified method and apparatus therefor for recording sources of sound simultaneously with the recording of depicted characters indicating the character of the sound produced by the source, sound depicting print 65 is arranged to be advanced by rollers 11 and 12 whereby the movement thereof is in a horizontal plane, the word tracks 21—21 also moving in a horizontal plane whereby the lines thereon may be more readily viewed by the speakers, or actors, as 66—66, who speak the lines 21a—21a as they intersect the center, or guide line 67. The speed of roller 11 is arranged to be controlled by the adjustable friction brake apparatus 68 whereby the rate of travel of the print 65 may be adjustably fixed if the handle 14 is employed for manually advancing said print. Roller 11 is also arranged to be driven by shaft 6 through suitable change speed gearing in gear unit 69. The camera 1 is so positioned and focussed that each frame recording the sound depicting characters will have the delineation substantially as shown by the dotted line 64.

Each of the speakers, or actors as 66—66 is arranged to establish a circuit through a circuit closer, as 70—70 preferably held in their hands, upon initially speaking a word or phrase, and open the circuit at the completion thereof for the purpose of recording certain identification marks, as will be more fully hereinafter described.

Referring to Fig. 10, showing a motion picture film 71 assumed to be advanced through cameras 1 and 9, the camera 9 supporting a light valve 31 for normally recording the sound waves 26 onto the sound track 27, and also being modified to receive mask 71a having light slits 72—72, controlled by valves 73—73 arranged to be raised to open said slits by energization of magnets 74—74 operating levers 75—75. Mask 76 supported by camera 1 and having aperture 76a, is arranged to pass image rays therethrough to the sound depicting track of film 71 for recording frames, as 77—77. A suitable light source 34 is arranged to direct a beam of light onto light slits 72—72 and be passed therethrough to the film 71 as valves 73—73 are raised, in this manner effecting the recording of lineal identification marks, as 78 in transversely spaced relation to the sound track 27 and the sound depicting frames 77—77. It is assumed that the first speaker 66 is in the act of speaking the word "help" and has closed the left hand circuit closer 70, thereby energizing the right hand magnet 74 and raising the left hand valve 73 in this manner permitting light to pass to the film whereby the identification line 78 is being recorded photographically onto film 71, and as more fully shown by Fig. 7, illustrating a portion of developed film 71. It will be noted by reference to the sound waves 26 recorded on track 27 at the lower end thereof, and by comparison with the lower sound identification line 78 and the frame 77 bearing number 01287, that the speaker evidently spoke first, then established the circuit to magnet 74, both operations occuring slightly before the H of the word "Help" intersected the center line 67. However the interval of time in each case being approximately less than $\frac{1}{50}$ of a second whereas in the exhibition of talking motion pictures it is recognized that the sound and action may have a disparity of as much as ⅕ of a second without being noticeable to patrons of a talking motion picture audience. Whereas the light slits 72—72 have been shown as positioned in the same transverse plane as the aperture 76, said aperture is positioned in the action recording camera 1 and due allowance made for the difference in the locations of the sound identification lines and the frames as 77, when inspecting the film 71. It is to be noted that whereas in speaking the word "Help" the spoken words have been overlapped thus producing a continuous sound record on the sound track 27, the sound identification lines, as 78—78 are separate and distinct thereby making it possible to accurately determine the relative positioning of the words on the sound track 26 with respect to the sound depicting track as 29 or 30a whereby an action track as 60 may be properly synchronized therewith as a talking motion picture production.

Figures 9, 12, 13:
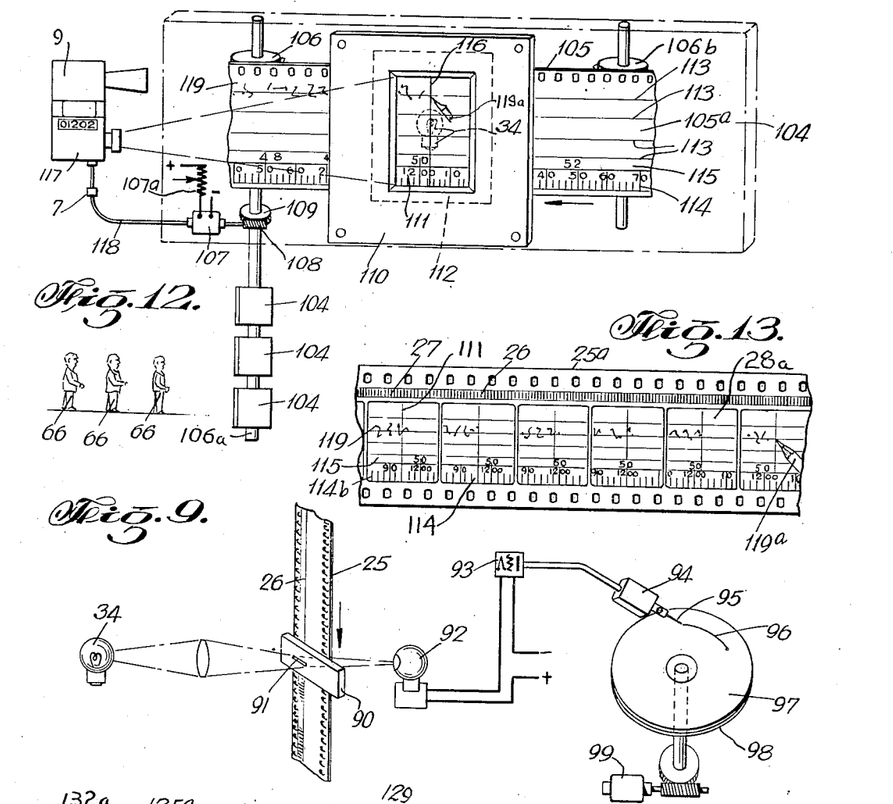

Referring to Fig. 9, showing a method and apparatus for producing a disk form of record member from a photographic sound record member, a motion picture film as 25 having a sound record track 26 thereon is advanced relatively to a light slit 91 in mask member 90, a beam of light from light source 34 being directed thereon. As said film is advanced relatively to said light slit the recorded sound waves 26 of said track vary the intensity of the light beam as it falls on the photoelectric cell 92 connected to a source of energy and amplifying, or gain unit 93, in this manner modulating the energy impulses received by the disk recording unit 94, the cutting stylus 95 of which is arranged to cut a sound track groove 96 in rotating disk 97, supported by disk supporting table 98 rotated by motor 99. After the recording disk has received a complete record, or such portion thereof as it may accommodate a suitable master record is formed from which any number of reproducing records may be made in known manner.

Referring to Fig. 11, showing a method for combining separately recorded sound and action records onto a single positive film for exhibition purposes, a suitable printing machine, as for example more fully shown in my application Serial No. 306,654, filed Sept. 18, 1928, now Patent No. 1,991,630, is arranged to advance a positive raw film, as 80, as said film is advanced an action negative film, as 59 is arranged to contact therewith whereby a light source as 81 will project a light beam through aperture 82 of aperture plate 83, arranged to print the frames of the action track 60 only, onto said positive film to form the action track 87, whereafter further advancement of said positive film will effect contact thereof with sound depicting film 25 and simultaneously light source 81 directing a beam of light through light slit 84 of mask 85 will print the sound record 26 only, onto said positive film to form the sound record track 86 whereby the action and sound records as 86 and 87 to be exhibited will be properly spaced transversely and longitudinally thereof when said film is developed as a finished product for the exhibition of a talking motion picture. The printing of the sound record 86 and the action record 87 as described is preferably in accordance with standards required by the Society of Motion Picture Engineers and wherein cor-related action precedes the sound by 14½ inches, whereby, when the positive film is projected by standard apparatus for projection, the reproduced sound and action will synchronize during the exhibition thereof. It is to be noted that by comparison of the reference numerals on the negative films as 25 and 59, as for example 01234 and 01235, etc., the printing of the sound and action records onto the positive film 80, may be varied at will to suit any form of exhibiting apparatus which may not conform to the standard named.

Referring to Fig. 12, showing one method and apparatus for producing one form of "continuity print" preferably termed the "dialogue or sound print" 105 comprising a printed tape or ribbon 105a arranged to be advanced through chronological apparatus 104. Said apparatus in part comprises roller 106 arranged to advance said tape, said roller being driven by motor 107 through worm and gear 108 and 109, the speed of the motor being varied by a suitable resistance 107a. Said apparatus also comprises an opaque plate 110 having an aperture 111 and below which is arranged a translucent plate 112 having a hairline 116 and below which is arranged a light source as 34. Said tape is arranged to pass between the opaque plate 110 and the translucent plate 112 whereby the light source 116 will depict the hairline 116 onto the tape as it is advanced by the roller 106.

The tape 105a supports recording lines 113—113 thereon for recording shorthand characters, as 119, as words or phrases are spoken by the speakers, as 66—66 as said tape is advanced by apparatus 104. Said tape also supports motion picture frame identification track 114 indicating numerally the frames cor-related to the recorded shorthand characters on lines 113. Said tape also supports the chronological track 115 indicating the time interval of each spoken word or phrase recorded as shorthand characters. The shorthand characters 119 are scribed by a regular stenographer who scribes the characters as they are spoken by the said speakers, the hairline 116 indicating the point at which the scribing instrument as 119a is to initially form the shorthand character as a word or phrase is spoken. It is to be noted that several recording lines as 113 are supplied and when two or more speakers are reciting lines, one apparatus as 104 is preferably supplied for each person speaking and it is also preferable to record the spoken lines of each speaker on a selected line 113 whereby more accurate chronological knowledge of the various spoken lines may be obtained.

As words are ordinarily spoken at the rate of four per second the tape 105a is preferably advanced at a rate of 1½ inches per second and as the accepted standard of recording and projecting talking motion pictures is 24 frames per second, each 1½ inches of tape, or one second in time represents 24 frames of film movement, or 1½ feet of film, therefore the scale may be said to be one inch to the foot.

Motor 107 is also arranged to drive action recording camera 117, through shaft 118, similar to camera 1, and arranged to co-operate with sound recording camera 9, the action camera 117 being arranged to photographically record the advancement of tape 105a as it moves relatively to the aperture 111 and as the short hand characters are being scribed by the stenographer, the sound recording camera 9 being arranged to simultaneously record the lines spoken by the speakers as they are being scribed by the stenographer. It is to be noted that the several chronological apparatuses 104 are driven in synchronism, as for example by shaft 106a, therefore the photographic recording of the characters 119 of one aperture 111 only is required, as the scribed characters of the other tapes, or dialogue prints 105 may be properly correlated thereto as more fully hereinafter described.

Referring to Fig. 13, showing a portion of a developed negative 25a recorded by camera 117, the negative being assumed to have been advanced in a horizontal plane therein, it will be noted that the short hand characters 119 representing the dialogue or sound produced may be accurately correlated to the sound waves 27 recorded on the sound track 26 by comparing the location of said characters to the location of the frame indicating line 114b of track 114 shown directly below. Whereas the pencil, or scribing instrument 119a shown photographically on the right hand frame and would properly appear on all frames, it has been omitted for clearer illustration.

Referring to Fig. 14, showing another form of continuity print 120, preferably termed the "action directing print" and whereon all the short hand characters appearing on all the dialogue or sound prints as 105—105 have been transformed into long hand form. Similarly to dialogue or sound direction print 105, the action directing print 120 also supports a motion picture frame identification track 114, however it will be noted that the spacing of the frame division lines 114b has been increased longitudinally of the print to accommodate the more lengthy long hand words 119b and also to more accurately correlate the initiation and duration of the word sounds to the action frames to be synchronized therewith. Said action directing print also includes one or more action direction tracks 121, in this instance assumed to direct the jaw movement and mouth opening of a speaker calling for "help", the upper or left hand line 122 of which indicated the closed position of the mouth and the lower line 123, a full open position thereof. The curves, or gradients 124, indicate the gradient and degree of opening and closing the mouth, or lowering and raising of the jaw to indicate the speaking of the word sounds to which the curves 124 are cor-related. The tracks 121 may be employed to indicate the movement of arms and legs of a dancing figure, as for example the dancing doll 52a shown on cartoon 52, of Figs. 4 and 5, the gradients 124 of one track 121 indicating the position of the legs and the gradients of another similar track indicating the position of the arms, and still another track 121 may indicate the mouth opening if the figure is assumed to be both dancing and singing. The gradients 124 in some instances may be substituted for written notes indicated some sustained action of one form, as for example "escaping steam from a blowing whistle" etc.

Figure 15:
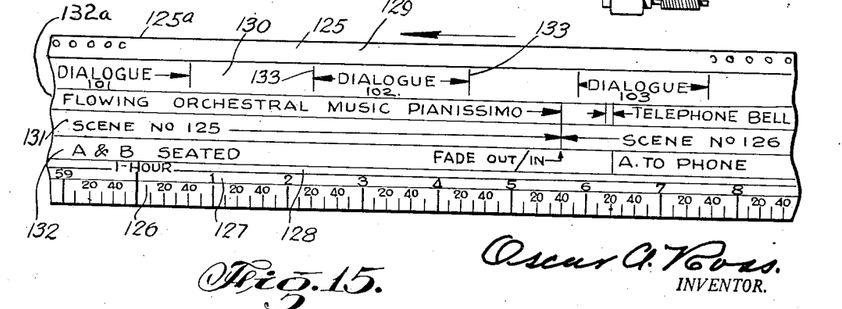
Fig. 15 illustrates another form of continuity, or "master print" employed as another step of the production of animated talking motion pictures.

Referring to Fig. 15, showing still another form of continuity print 125, preferably termed the "master print" said print having preferably printed thereon chronological tracks 126 indicating seconds, track 127 indicating minutes, and track 128 indicating hours, said print also having track 131 for indicating the scenes or sequences, track 130 for indicating the periods of dialogue, or song, and tracks 129, 132 and 132a for indicating briefs of the action, stage settings, incidental sounds, or other general information as may be required. Said master print comprises a tape or ribbon, 125a preferably of paper, and during the recording of a play or sketch chronologically, said tape is advanced by chronological apparatus 104, however said apparatus is operated at comparatively slower speed and whereby each second division on the second track 126 intersects the hair line 111 every ten seconds. In other words comparing the length of the master print 125 to the length of the motion picture film which it will represent, it may be said that the ratio is as 1 to 288, one foot of master print representing 288 feet of motion picture film cor-related thereto. As said tape is advanced by said apparatus the director or an assistant, scribes, or otherwise marks the vertical lines 133 indicating the start or stop of a dialogue, or other form of sound, or action, as said sound or action is enacted during the performance of a play or sketch, also indicating between the start and stop lines 133, the character of the sound or action being produced, as for example "dialogue", "flowing orchestral music pianissimo" "telephone bell ring" etc., in this manner composing a condensed chronological key, or chart to the play or sketch to be produced as a talking motion picture. Suitable rubber stamps may be employed for thusly composing the master print.

*Application*

As an initial preparation for producing animated talking motion picture productions by applicants novel method, especially if the production comprise a play or sketch of considerable length and in the initial form of a novel, or other book, it is preferable to prepare the usual continuity print indicating the scenes or sequences and the actions, also the book of lines, or dialogue, or other sounds to be produced. The play or sketch is then preferably rehearsed by live actors or other persons to correct errors in or improve the lines and/or stage settings, etc. After the performance runs smoothly, one or more rehearsals are enacted simultaneously chronologically recording the dialogue, or song, the scenes, etc., onto master prints 125 as they are advanced by chronological apparatus 104. Whereas it is preferable to record the various scenes, sequences or acts in regular order as they would appear when exhibited, and the apparatus 104 only stopped for change of scene, or act, said scenes, or acts may be recorded in irregular sequence and a corrected master print 125 prepared from the master prints depicting the irregular recorded order. These master prints 125 form the master chronological key to the play or sketch to be produced as an animated talking motion picture production.

Preferably simultaneously with producing the master print 125 as a performance is enacted, the dialogue or sound prints 105—105 are also produced, however if it is desired to analyze the master print 125 for final correction of time intervals of scenes or acts, etc., one or more corrected master prints as 125 may be made with or without rehearsals, however for fineness of production it is preferable to conduct a final rehearsal simultaneously with producing the final master prints and the dialogue or sound prints. After the final master prints and dialogue or sound prints are produced as described they are compared and corrected as may be required to synchronize chronologically. It is to be noted that simultaneously with the production of one of the dialogue or sound prints 105, the recording of the short hand characters onto said print has been photographically recorded by the camera 117 in cor-relation to the sound record recorded by camera 9, and as more fully shown by the sound depicting negative 25a (Fig. 13) the hair line 111 of each frame 28a, indicating on the frame identification track 114 the number of the frame to be synchronized with the action frame cor-related thereto when the action and sound records are finally combined onto a single film, or separated films, see Fig. 11.

After one or more dialogue or sound prints, as 105 have been produced as described, the action thereon is transferred to the action direction print 120 as described, a skilled person also adding the action gradients, as 124—124 together with such other information as may be required for properly directing the animated action to be recorded by camera 40. Whereas the master print 125 is usually formed as one continuous strip representing one complete production of talking motion picture of predetermined length, the dialogue or sound prints 105, are preferably formed as one continuous strip for each scene or sequence whereby the animated action to be produced subsequently for differing scenes may be photographically recorded by a number of cameras as 40 simultaneously, to speed up the production.

After one or more action direction prints as 120 have been produced as described, the action to be accompanied thereto is photographically recorded as shown by Figs. 4 and 5, the animated being or cartoons being adjusted to position by a skilled person as called for by the information on said prints. Whereas the object photographically recorded by the camera 40 is shown as a dancing figure in cartoon form, it may be a plastic, or jointed doll, or other inanimate being, or figure which it may be desired to depict as being animated in an animated talking motion picture exhibition. Whereas it has been assumed that the action direction print 120 has been made up from the dialogue or sound prints 105 with the film 25a as a check thereover, it is often preferable to prepare a subsidiary dialogue or sound print, as 65, (Fig. 6) from the initially produced dialogue or sound prints, as 105, thereafter advancing said subsidiary print by the apparatus shown in Fig. 1, or 6, while the camera 9 records the sound produced by the speakers, musicians and/or musical instruments, and the camera 1, depictedly records the sources effecting the sound produced, as more fully shown by the films 25 and 71, (Figs. 2 and 7) the films 25 and 71 also being employed to compose an action direction print, as for example, the print 120.

After the animated action has been recorded by camera 40 in cor-relation to an action direction print, as 120, and the resulting negative, as for example, negative 59, (Fig. 5) has been developed as a finished product, the action record thereon may be printed onto a positive film, as 80, more fully described in connection with Fig. 11, and onto which film may also be printed the cor-related sound record of films 25 or 71, said film after development comprising a finished animated talking motion picture film for exhibition purposes.

When a musical selection is to be synchronized to an action, as for example the dancing figure 52a depicted on action film 59, the musical score of the musical accompaniment is photographically recorded simultaneously with the recording of the sound, as more fully described in connection with Figs. 1 and 2, whereafter the resulting sound depicting print film 25 is employed to animate the figure of the cartoon whereby the action thereof recorded will synchronize with the rhythm, or beats of the music as and when the action and music are simultaneously exhibited as an animated talking motion picture production.

As an example of the use of action direction print 120, assume the portion of the print shown to represent four monkeys to be animated as in distress about to be eaten up by a lion. For photographically recording frame 1187 the mouth of the first monkey is opened slightly, for recording frame 1188 it is opened approximately ¼, for frame 1189, ½ way, frame 1190 closed to ¼ way, 1191, almost closed, and frame 1192 completely closed, the five frames requiring approximately one fifth second of action as exhibited by a motion picture film, such an interval being fairly representative of the length of time for a human being to call the word "Help" rapidly. Furthermore when calling for help the mouth is only approximately one half opened. In the second cry for help by the same four monkeys, it will be noted their cry has been lengthened to approximately seven frames or approximately one third of a second indicating more agonizing cries.

Whenever the reproduced sound to be accompanied to an animated talking motion picture action is to be produced by a disk record for exhibition purposes, the sound record initially recorded onto a film as 25, 25a, or 71, said sound record is reproducingly transferred onto a disk record by the method shown by Fig. 9, said disk records being thereafter rotated in synchronism with the advancement of a positive film depicting the action shown by the negative film, as 59, in known forms of projection apparatus.

It is to be noted that whereas the various forms of continuity prints as 105, 120 and 125 have been described as associated with the production of animated talking motion pictures, they may be equally aptly adapted to regular talking motion picture productions wherein regular human beings are caused to recite the spoken lines.

Whereas the separatedly recorded sound and action records have been shown as finally printed onto a single positive talking motion picture film, they may be finally printed onto separated film and exhibited by projection apparatus more fully disclosed by my co-pending application for Letters Patent Serial Number 306,656, filed September 18th, 1928.

Whereas the circuit closers as 70—70 have been shown to close the circuits to the light valves 73—73 said circuit closers may be substituted for vibrating reeds each positioned adjacent a microphone into which only one of the speakers direct the sound to be recorded, each of said reeds by vibration thereof being arranged to close a circuit to a cor-related valve 73.

Whereas the sound initiation and duration marks as 38 and 78 have been shown as recorded parallel to sound and sound depicting records on a single film, they may be recorded onto separated film traveling at the same rate of travel as the sound record film, or at a lower multiple thereof, or said sound initiation and duration marks may be recorded onto a chemically treated paper tape for more economical recording, the amplifying or gain unit 93 also furnishing sound modulated energy for electrically recording onto said chemical tape, or the circuit closers 70—70 may be caused to establish a circuit arranged to electrically record said marks onto said tape.

Whereas a pencil as 119a is shown for more clearly illustrating the recording of the short hand characters, it is preferable to employ a typewriting machine arranged to type short hand characters for such recording, a modification of a known form of machine being employed.

Whereas the sound depicting record as 65 has been shown for directing the actors as 66—66, in speaking their lines to be recorded by camera 9, the continuity print 120 may also be employed for this purpose.

It is to be understood that the term "action" wherever employed is meant to imply "motion" as understood in the expression "sound motion pictures" or "talking motion pictures".

Whereas in composing the action direction print 120, the sound initiation and duration marks as 38 or 78 are employed to indicate the number of frames required for the action to be synchronized thereto, and the recorded depicted sound character frames as 28, 28a or 77, are employed to indicate the character of the sound produced, said initiation and duration records may be employed in cor-relation with analysis of the book of lines from which the words or sounds may be graphically recorded onto the record member supporting said initiation and duration marks.

For more ready inspection and handling, the prints as 105, 120 and 125, may be cut into uniform length sections longitudinally and each successive section placed directly below the preceding section, in this manner making a more compact print, each section resembling a line on a ruled page or sheet of paper having approximately equal sides.

The methods and apparatus including the films produced thereby should be construed as typical only and not as limiting the invention, the scope of which is designated in the appended claims.

What I claim is:—

1. In apparatus for producing sound motion picture records, a translucent tape having a metric scale track indicating film footage travel of sound motion picture film, one or more recording tracks on the tape extending parallel to the scale track for receiving records thereon, an aperture plate having a view opening, a light transmitting member arranged spacedly below the aperture plate and the viewing opening, means for advancing the tape through the space between the plate and the light transmitting member, the tape being advanced in accordance with the indications of the scale track, a light source for projecting light through the light transmitting member and the tape through the viewing opening, and indicating means in the path of the projected light for producing an indication on the tape for directing the recording of the records thereon.

2. In the art of recording sound motion picture sequences the method which involves, advancing a light sensitive film and a recording tape synchronously during the production of sound motion picture sequences, photographically recording the sound of the sequences onto the film, graphically recording a word record of the sound recorded onto the advancing tape simultaneously with the production of the sound, and photographically recording a picture record of the recorded word record onto the film parallel to the sound record and in synchronism therewith.

3. In a recording system, sound wave recording apparatus including mechanism for advancing a record member to record a sound wave record of sound onto said member, one or more graphic recording apparatus arranged to advance an indexed reading tape for recording reading matter onto said tape corresponding to said sound wave record, a translucent member on each graphic recording apparatus over which said tape advances when recording the reading matter thereonto, an indicator within the area of exposure of said translucent member for indicating the location at which the reading matter is to be recorded, and means connecting said sound wave recording apparatus and said graphic recording apparatus for effecting synchronous advancement of said record member and said tape.

4. In a recording system, sound wave recording apparatus including mechanism for advancing a record member to record a sound wave record of sound onto said member, one or more graphic recording apparatus arranged to advance an indexed reading tape for recording reading matter onto said tape corresponding to the sound wave record, a member having an opening therein past which said tape advances for exposure thereof to record the reading matter thereonto, an indicator positioned within the area of said opening for indicating the location on said tape whereat said reading matter is to be recorded with respect to said index thereon, and means connecting said sound wave recording apparatus mechanism and said graphic recording apparatus mechanism for effecting synchronous advancement of said record member and said tape.

5. In a recording system, sound wave recording apparatus including mechanism for advancing a record member to record a sound wave record of sound onto said member as it advances, a graphic recording apparatus including mechanism for advancing an indexed reading tape to record reading matter onto said tape corresponding to said sound wave record, means for indicating the location on said tape at which the reading record is to be recorded, and means connecting the record member advancing mechanism and the tape advancing mechanism for effecting synchronous advancement of said record member and said tape.

6. The method of recording sound motion picture records which involves, advancing a light sensitive motion picture film, a light sensitive sound record film and an indexed reading tape synchronously during the enactment of scenes forming part of a sound motion picture production, photographically recording a picture record of the scenes onto the picture film as it advances, photographically recording a record of the sound produced during the enactment of said scenes onto said sound film simultaneously with recording said pictures, and recording a reading record of the produced sound onto said reading tape in correlation to said index thereon simultaneously with the recording of said sound onto said sound film.

7. The method of producing animated sound motion picture productions from books or plays which involves, advancing time charts and sound charts simultaneously with producing sounds adapted from said books or plays, recording indexed time interval notations of said sounds onto said time charts simultaneously with recording condensed word records of said sounds onto said sound charts, preparing normal reading charts from observing said condensed word charts, advancing said normal reading charts, photographing successive pictures of said advancing reading charts simultaneously with recording sound wave and sound character records of sound produced from observing said advancing reading charts, observing the successive photographs of said reading chart and preparing animated cartoon picture sequences correlated thereto, photographically recording said cartoon picture sequences, and then combining said cartoon picture sequence records and said sound records onto a common record member by utilizing the index record on said time charts for determining the relative positions of said cartoon picture sequences and said sound records on said common member.

8. The method of producing animated sound motion picture records for sound motion picture productions which involves, producing sound forming part of said productions, advancing an indexed sound chart uniformly, recording a condensed word record of said sound onto said advancing sound chart simultaneously with the production thereof, observing said condensed word record and preparing a normal reading chart in accord therewith, advancing said normal reading chart and a light sensitive film having picture and sound tracks synchronously, photographing successive pictures of said advancing reading chart onto the picture track of said film simultaneously with photographically recording sound producing from observing said advancing chart onto the sound track of said film.

9. The method of producing animated sound motion picture records from books or plays to be adapted for sound motion picture production which involves, advancing an indexed time chart and successive sound charts uniformly simultaneously with producing sound sequences adapted from said books or plays, recording successive indexed time interval notations of said sound sequences onto said time chart simultaneously with recording a word record of said sound sequences onto said sound charts, photographically recording successive pictures of said advancing sound charts simultaneously with photographically recording a sound wave record of said sound sequences onto successive films advanced synchronously with said time and sound charts, preparing indexed action picture charts from observing said photographed sound chart pictures, preparing successive cartoon picture sequences from observing said action charts, photographing said cartoon picture sequences onto film and then forming a single composite synchronous record of said photographed cartoon picture sequences and said photographic sound record sequences by utilizing the indexed notations on said time chart for determining the sequential order of recording said cartoon picture sequences and said sound record sequences onto said composite record.

10. The method of producing animated sound motion picture records from books or plays adapted for sound motion picture production which involves, producing sound and action adapted from said books or plays simultaneously with advancing a time chart and successive sound charts, recording annotated lapsed time intervals of said sound and action onto said time chart simultaneously with recording a word record of said sound sequences onto said sound charts, photographically recording successive pictures of said advancing sound charts simultaneously with photographically recording a record of said sound sequences onto films advanced synchronously with said time and sound charts, observing said photographed sound chart pictures and preparing action charts indicating the action sequences to be produced to the accompaniment of said sound record sequences, observing said action charts and preparing successive cartoon picture sequences correlated thereto, photographing said cartoon picture sequences onto successive films, and then printing said photographed cartoon picture sequences and said photographed sound record sequences synchronously onto a single film utilizing the indexed notations on said time chart for determining the sequential order of printing said cartoon picture and sound sequences.

11. The method of producing sound motion picture records from books or plays adapted for sound motion picture productions which involves, advancing a time chart and successive sound charts synchronously, the time chart being advanced at a slower rate of travel than said sound charts, producing sound and scene adapted from said books or plays, recording annotated lapsed time intervals of sound and scene onto said time chart simultaneously with recording a word record of said sounds onto said advancing sound charts.

12. The method of producing sound motion picture records from books or plays adapted for sound motion picture production which involves, advancing a time chart, a sound chart and a light sensitive film synchronously, producing sound adapted from said books or plays, recording indexed annotated lapsed time intervals of said sounds onto said advancing time chart as a chronological record of said production simultaneously with recording a word record of said sounds onto said advancing sound chart and photographing successive pictures of said sound chart onto said film simultaneously with recording the word record thereon.

13. The method of producing sound motion picture records for sound motion picture productions which involves, advancing an indexed sound chart and a light sensitive film having picture and sound tracks synchronously at a uniform rate of travel, producing sounds forming part of said production, recording a reading record of said sounds onto said advancing sound chart simultaneously with photographically recording a successive picture record of said chart onto the picture track and photographically recording a sound record of said sounds onto the sound track of said film.

OSCAR A. ROSS.